United States Patent [19]
Van Russelt et al.

[11] 3,862,259

[45] Jan. 21, 1975

[54] REINFORCED RUBBER COMPOSITIONS

[75] Inventors: Michel Van Russelt, Brussels; Claude Bleiman; Jean Mercier, both of Kessel-Lo, all of Belgium

[73] Assignee: GERDEC, Paris, France

[22] Filed: July 11, 1973

[21] Appl. No.: 378,211

[30] Foreign Application Priority Data

July 11, 1972  France .............................. 72.25031

[52] U.S. Cl............ 260/754, 260/42.11, 260/42.32, 260/42.37, 260/763, 260/766
[51] Int. Cl... C08c 11/10, C08c 11/16, C08c 11/18
[58] Field of Search........... 260/42.15, 42.32, 42.37, 260/754, 763, 766, 41.5 A

[56] References Cited
UNITED STATES PATENTS

| | | | |
|---|---|---|---|
| 3,350,345 | 10/1967 | Vanderbilt et al............ | 260/46.5 A |
| 3,494,884 | 2/1970 | Kraft.............................. | 260/41.5 A |
| 3,500,603 | 3/1970 | Strack............................ | 260/41.5 A |
| 3,637,576 | 1/1972 | Sutherland..................... | 260/41.5 A |
| 3,642,954 | 2/1972 | Turner........................... | 260/41.5 A |
| 3,692,816 | 9/1972 | Della Faille et al.............. | 260/46.5 |

OTHER PUBLICATIONS

Kraus–Reinforcement of Elastomers (Wiley) (N.Y.) (1965), pages 417, 426 & 427, TS 1925 K7.

*Primary Examiner*—Morris Liebman
*Assistant Examiner*—H. H. Fletcher
*Attorney, Agent, or Firm*—Millen, Raptes & White

[57] ABSTRACT

Cured natural rubber compositions having improved physical properties, e.g., break strength and elongation at break are obtained from rubber compositions reinforced with a mixture of a) carbon black, and/or silicon and b) silanated phyllosilicates.

14 Claims, No Drawings

REINFORCED RUBBER COMPOSITIONS

BACKGROUND OF THE INVENTION

This invention relates to elastomeric natural rubber compositions reinforced by carbon black and silanated phyllosilicates.

Despite the development in recent years of many synthetic elastomeric materials, natural rubber possesses many properties which have kept it as the preferred elastomer for many industrial applications. The term "natural rubber" as used herein refers to an elastomeric hydrocarbon polymer consisting essentially of isoprene repeating units, at least 90 percent and preferably at least 98 percent of which are in the cis-1,4 configuration. Thus, it is intended to include not only natural rubber obtained from biological sources, especially the rubber tree *Hevea brasiliensis, but also elastomeric cis*-1,4-polyisoprenes prepared synthetically, e.g., with either lithium-based or Ziegler catalysts which are well known in the art.

Hevea rubber contains approximately 5,000 isoprene units in the polymer chain, while the synthetic cis-1,4 polyisoprenes can have larger or smaller molecular weights as desired according to the particular polymerization process employed.

Smoked sheet and pale crepe represent the forms in which the most natural rubber is commercially available. The smoked sheet is obtained by acid coagulation of the latex, sheeting the coagulum, and then drying and smoking the resultant sheets or rubber. Pale crepe is obtained by treating the latex either before or after coagulation with sodium bisulfite and then washing, drying, and sheeting. Synthetic rubbers are usually obtained as baled sheets, made from the coagulum of a polymerization process.

Vulcanization improves the elasticity and aging properties of crude rubber, but in most cases it is necessary to further enhance such properties as tensile strength, abrasion resistance, and tear resistance by the incorporation of reinforcing fillers. The physical properties of the resulting vulcanizate are affected by both the type and the amount of filler.

Carbon black is the most universally used filler in the rubber industry. The three types of carbon blacks used commercially in the greatest bulk for this purpose include the channel, furnace, and thermal blacks. Each of these types may be further classified according to particle size and surface structure and then selected according to the specific properties which are required in the end product.

In addition to the carbon blacks, inorganic reinforcing agents, such as zinc oxide and the silicas, are used for the reinforcement of light-colored end products. The silicas are used in those products in which high abrasion resistance is an essential requirement.

Numerous attempts have been made to replace carbon black by other fillers, in particular by light-colored fillers which can be used for the manufacture of elastomeric materials either translucent or capable of being colored different tints. For this purpose, different silicon compounds, and in particular the silica and silicates have been proposed. Generally the addition of such fillers does not give entirely favorable results. According to the adduct used, there is obtained a material unsuitable for injection and/or a large decrease in the physical properties is observed and/or an insufficient reinforcement of the rubbery mixtures is obtained in comparison with identical mixtures reinforced with carbon black. At most, filled products can be obtained with properties approaching those of the rubbers reinforced with carbon black, but the manufacture of such products requires the use of pure silica having a low and well-determined specific area (of about 10 to 80 m$^2$/g.)

It has also been proposed to replace the carbon black by phyllosilicates previously subjected to mechanical or chemical treatment. For example, it has been proposed to use ground asbestos chrysotile fibers having a grade within the range from 1 to 5 (the grade relates to the fiber length, a higher grade corresponding to a shorter fiber). It has also been proposed to use as a strengthening filler asbestos fibers obtained by treatment of natural fibers having a grade within the range from 1 to 3 with silane coupling agents (e.g., gamma-amino-propyltriethoxy silane), with trichloroorganosilane compounds (e.g., methyl and phenyl silanes of chrysotile) in the presence of isopropyl alcohol or acetic acid as a diluent, or by triphenyl methane triisocyanate using dichloromethane as solvent.

Whatever is the applied treatment, the addition to natural rubber of these asbestos fibers treated in a mechanical and/or chemical way improves only some of the mechanical properties of natural vulcanized rubber in comparison with those of an identical unfilled rubber, but even these improved mechanical properties remain very inferior to those of a similar rubbery composition filled with carbon black.

della Faille et al. in U.S. Pat. No. 3,692,816, the contents of which are incorporated by reference herein, describe novel organomineral polymeric materials which are useful strengthening fillers for resins and elastomers, e.g., SBR and EPR rubbers. Briefly, the material comprises a siliceous mineral framework constituted by the two-dimensional framework of a phyllosilicate and organic radicals having a reactable group which is capable of polymerization, the radicals being linked by Si-O-Si siloxane bonds to the tetrahedral layer of the phyllosilicate from which a fraction of the octahedral layer has been removed. The method of preparation of the material comprises acid hydrolysis of a phyllosilicate for the partial removal of the octahedral layer, followed by reaction of the phyllosilicate with an organosilane having at least one reactable organic group which is capable of subsequent polymerization.

The above-mentioned organomineral polymeric materials when incorporated in natural rubber matrices improve the mechanical properties of the obtained compositions. When these fillers are associated with known fillers, such as carbon black and/or silica, a synergic effect is observed on the properties of the natural rubber compositions reinforced with either filler alone. This synergic effect is not generally observed with synthetic elastomers and depends on the matrix. For example the mixed fillers constituted by silanated fillers and carbon black give with S.B.R. rubber compositions having mechanical properties very inferior to those of a similar rubbery composition filled with carbon black alone.

OBJECTS OF THE INVENTION

It is an object of the present invention to provide natural rubber compositions having improved mechanical properties.

Another object of the present invention is to provide natural rubber compositions having improved rebound elasticity, torsion modulus and Goodrich heating properties.

A further object of the present invention is to provide natural rubber compositions having improved break strength and elongation at break values.

An additional object of the present invention is to provide natural rubber compositions containing synergistically effective filler combinations.

Other objects and advantages of this invention will become apparent to those skilled in the art upon further study of the specification and appended claims.

SUMMARY OF THE INVENTION

Briefly, the above and other objects are attained in one aspect of the present invention by providing a curable rubber composition comprising elastomeric cis-1,4 polyisoprene and a curing or vulcanizing agent, characterized by containing 5–150 parts by weight per 100 parts by weight of elastomer of a strengthening filler combination wherein the amount of each filler component used is 25–75 percent of the weight of each individual component which would be required when used alone to give a desired hardness to the cured elastomer, said strengthening filler comprising:

a. 25–75 percent of an organomineral polymeric material consisting essentially of a siliceous mineral two-dimensional framework of a phyllosilicate having at least a tetrahedral layer consisting essentially of silicon and oxygen and an octadhedral layer consisting essentially of oxygen and metallic atoms other than silicon, and organic radicals having two to 12 carbon atoms having at least one ethylenic double bond linked by Si-O-Si siloxane bonds to said tetrahedral layer of said phyllosilicate, at least 5 percent by weight of the metallic atoms having been removed from the octahedral layer of the phyllosilicate and substituted by said organic radicals, 1 to 30 percent of the silicon atoms of said tetrahedral layer of said phyllosilicate having said organic radicals grafted on them by Si-O-Si bonds, and containing 0.2–20 wt. percent grafted carbon; and b. correspondingly 75–25 percent of said required weight of carbon black, silica or mixtures thereof.

DETAILED DISCUSSION

The present invention relates to elastomeric compositions based on natural rubber in which the strengthening filler is at least partially constituted by silanated phyllosilicates and carbon black and/or silica.

It has been surprisingly found that in compositions based on natural rubber the carbon black is replaced advantageously by certain siliceous fillers constituted by silanated phyllosilicates such as defined herein, which give particularly interesting properties to the resultant compositions. These silanated phyllosilicates can be obtained by using the process disclosed in U.S. Pat. No. 3,692,816. In this process an organo-mineral material is prepared in a single step by reaction in the presence of a mineral acid and of a saturated alcohol, a ketone or an ether, of a phyllosilicate with an organosilane (e.g., methylvinyldichlorosilane) having at least one reactable organic group which is capable of subsequent polymerization and also having at least one hydroxyl, halogen or alkoxy group which is attached to the silicon of the organosilane molecule or has a disiloxane function. The resultant silanated fibers are defined by the percentage by weight of carbon grafted on the fiber by the organosilane. The silanated phyllosilicates suitable for the present invention can contain between 0.2 and 20 percent, and preferably between 2 and 10 percent of grafted carbon by weight. The starting minerals used are preferably of the fibrous type, particularly the asbestos fibers, but phyllosilicates of the lamellar type can be used, e.g., mica, hydromica and vermiculite, to mention only some examples which are particularly common but are not given in any sense by way of limitation.

The utilization of these silanated phyllosilicates, called below "silanated fillers," as strengthening fillers in the elastomers based on natural rubber, significantly increases mechanical properties even in comparison with compositions strengthened with carbon black. In particular, large increases of both the rebound elasticity and torsion modulus and a decrease of the Goodrich heating are observed. Furthermore in the composition in accordance with the present invention, a better dispersion of the silanated fillers is obtained which is definitely improved relative to the dispersion of similar untreated fillers. Moreover, when using mixed fillers constituted by silanated fillers and silica in the absence of carbon black, there is obtained light-colored products very easy to dye.

The amounts of fillers used for the preparation of the compositions in accordance with the present invention can vary over a considerable range: they are most often between 5 and 150, generally 10 and 130 and preferably 20 and 100 parts by weight of silanated fibers per 100 parts by weight of the elastomer. Within these limits, the optimum amounts of fillers are determined by those skilled in the art according to the qualities of the final product required for a given application. In particular the hardness of the final product increases and on the contrary its elasticity decreases when the filler amount is increasing.

It has now been found advantageous to use reinforcing mixed fillers constituted in part by silanated fillers and in part by carbon black. Indeed, it has been found that in many cases by using mixed fillers a synergic effect is observed on the properties of the elastomeric compositions, in particular on the elongation at break and the breaking strength. The amounts of mixed fillers can vary over the same range that those of silanated fillers alone, i.e., 5–150 parts by weight per 100 parts by weight of the elastomer. In the usual practice, the percentage of each filler is determined in relation to the optimum amount of each filler taken separately, meaning the quantity of single filler required to obtain a given hardness. For example, in preparing a composition having a given hardness, the optimum amounts of silanated filler and of carbon black when used alone are determined separately. Each of these optimum amounts are assigned a value of 100. If the amount of silanated fibers in the filler mixture is for example equal to 30 percent by weight of the optimum amount of this filler alone, then the amount of carbon black in the filler mixture is equal to 70 percent by weight of the optimum amount of carbon black alone. Under these conditions it has been found that the best results are generally obtained when the proportions of each filler are between 25 and 75 percent by weight of the optimum amount of each filler, and in particular at about 40–60 percent by weight, especially at about 50 percent by weight.

Carbon blacks useful in the present invention are well known in the art and include but are not limited to channel, furnace and thermal blacks, and acetylene blacks. Of these, preferred are furnace blacks such as high abrasion furnace (HAF), super abrasion furnace (SAF) intermediate super abrasion furnace (ISAF) and semi-reinforcing furnace (SRF) Silica and silicates useful in the present invention are likewise known in the art and include but are not limited to compounds having a surface area in the range comprised between 100 to 300m2/g and an average dimension of particles in the range comprised between 5 to 200m$\mu$. Of these, preferred are silica which have a surface area in the range comprised between 120 to 250m2/g and preferably 140 to 200m2/g and an average dimension of particles inferior to 100m$\mu$.

The preparation of the compositions in accordance with the present invention is achieved under any conventional conditions known for vulcanization of natural rubber. For example, the gum rubber is mixed in an open roller mill and, after mastication, the antioxidant agents are quickly incorporated in order to avoid any degradation. The reinforcing filler and plasticizers are then added and, at the end of the mastication, vulcanization agents are added. The vulcanization is then carried out by pressing, and the optimum conditions are determined conventionally.

In accordance with the present invention, all the conventional matrices of natural rubber may be used. The vulcanization can be achieved by means of sulfur or peroxides according to the usual methods. Likewise, various additives can be used in the compositions in accordance with the present invention, these additives being products known in the prior art for use in the manufacture of elastomers, e.g., accelerators, stabilizers, antioxidants, thickeners, etc.

When desired, it is also possible to add to these compositions, beside the silanated fillers and carbon black, another type of known filler such as silica or silicates. Due to the possibility of using very different fillers, the present invention allows the tailoring of products to properties which are well-adapted for the many applications of conventional natural rubber compositions. Moreover, when contemplating a given property, it is now possible to greatly broaden the scope of use beyond that of comparable conventional compositions.

Indeed, up to now it was possible by using known fillers to improve a mechanical property of the rubbery composition but this improvement was generally accompanied by a detrimental effect on the others properties. By using mixed fillers constituted by silanated fibers, carbon black and silica the increase of the breaking strength and of the elongation at break was obtained without any detrimental effect on the other properties.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. In the following Examples, the temperatures are set forth uncorrected in degrees Celsius; unless otherwise indicated, all parts and percentages are by weight.

EXAMPLE 1

Silanated asbestos fibers obtained by treatment of asbestos fibers with methylvinyldichlorosilane according to the process disclosed in U.S. Pat. No. 3,692,816 were incorporated in a natural rubber of "Cercle jaune" quality. The asbestos fibers contained respectively 2.3, 4.9 and 9.4 percent of grafted carbon by weight. By way of comparison, a similar composition was prepared by using carbon black alone as filler. The quantities of different fillers were adjusted to obtain compositions having a hardness (DIDC) as close as possible. The vulcanization was achieved with a peroxide, and compositions having hardness equal to 70± and 80± 5 were prepared. Proportions of the different ingredients are given in parts by weight in Table 1.

TABLE 1

| | | |
|---|---|---|
| Hardness 70± 5 | | |
| Smoked sheets ("Cercle jaune") | 100 | 100 |
| * Vulcan 3 | 45 | — |
| Silanated fibers | — | 20 |
| ** Di-Cup 40C | 8.75 | 8.75 |
| Hardness 80± 5 | | |
| Smoked sheets ("Cercle jaune") | 100 | 100 |
| Vulcan 3 | 90 | — |
| Silanated fibers | — | 40 |
| Di-Cup 40C | 8.75 | 8.75 |

* Vulcan 3: Cabot HAF carbon black
** Di-Cup 40C: Dicumyl peroxide containing 40% by weight of active product and 60% by weight of precipitated calcium carbonate (Hercules, Inc.)

The vulcanization kinetics were studied by using a Monsanto rheometer at 150°C. The sheets so obtained were perfectly translucent.

The properties of the sheets vulcanized at the optimum were measured. Table 2 gives the properties of the compositions having a hardness equal to 70± 5. Table 3 gives the properties of the compositions having a hardness equal to 80± 5.

These results show that for a similar hardness (DIDC) the substitution of carbon black by silanated fibers improves the properties of the vulcanized products. In particular.

the rebound elasticity is increased,
the resistance to repeated compression is better, which is shown by a lower internal heating,
the torsion modulus is increased when the temperature increases.

The latter property is particularly exceptional for, by using carbon black, even in a higher quantity, the torsion modulus decreases when the temperature increases and this diminution grows when the temperature augments.

TABLE 2

| Nature of Filler | Carbon Black HAF | Silanated fibers | | |
|---|---|---|---|---|
| | | 2.3%C | 4.9%C | 9.4%C |
| Amount of filler % by weight | 45 | 20 | 20 | 20 |
| Vulcanization time at 150°C, minutes | 35 | 35 | 35 | 35 |
| Hardness DIDC | 71 | 70 | 71 | 68 |
| Modulus at 100% kgf/cm$^2$ | 56 | 96 | *breaking for an elongation below 100% | |
| Tear strength kgf/cm | 29 | 28 | 30 | 32 |
| Rebound elasticity % | 62 | 68 | 69 | 71 |
| Remanent deformation after compression of 25%, for 22 hours at 70°C, % | 3.2 | 4.9 | 3.3 | 3.2 |
| Resistance to repeated compression Goodrich heating °C | 14 | 9 | 9 | 8 |
| Remanent deformation % after 30 minutes | 1.25 | 0.8 | 1.2 | 1.2 |
| Torsion modulus (10$^{-7}$ dynes cm$^{-2}$) | | | | |
| 3G at 20°C | 9.67 | 11.20 | 12.30 | 8.85 |
| 3G at 100°C | 9.44 | 13.5 | 14.7 | 10.5 |
| 3G at 250°C | 6.36 | 17.80 | 18.10 | 12.10 |

TABLE 3

| Nature of Filler | Carbon Black HAF | Silanated Fibers | | |
|---|---|---|---|---|
| | | 2.3%C | 4.9%C | 9.4%C |
| Amount of filler % by weight | 65 | 40 | 40 | 40 |
| Vulcanization time at 150°C, minutes | 35 | 35 | 35 | 35 |
| Hardness DIDC | 80 | 77.5 | 78 | 80.5 |
| Tear Strength kgf/cm | 28 | 32 | 26 | 28 |
| Rebound elasticity % | 55 | 65.5 | 66.5 | 67 |
| Remanent deformation after compression of 25% for 22 hours at 70°C, % | 3.8 | 6.4 | 4.9 | 3.3 |
| Resistance to repeated compression Goodrich heating °C | 22 | 21 | 11 | 11 |
| Remanent deformation, % after 30 minutes | 1.1 | 0.8 | 0.8 | 0.8 |
| Torsion modulus (10$^{-7}$ dynes cm$^{-2}$) | | | | |
| 3G at 20°C | 21.1 | 18.7 | 17.9 | 22.10 |
| 3G at 100°C | 17.4 | 21.1 | 24.7 | 25.7 |
| 3G at 250°C | 8.2 | 24.2 | 25.6 | 31.15 |

EXAMPLE 2

Different compositions containing varying proportions of silanated asbestos fibers (containing 2 percent of grafted carbon by weight) were prepared. The vulcanization was achieved with a sulfur system and the vulcanization kinetic was measured with a rheometer MIE at 150°C. Table 4 gives the proportions of ingredients in parts by weight for each composition.

The mechanical properties of the different compositions were measured at the optimum vulcanization. These properties are given in Table 5.

Table 5 shows that the modulus at 100, 200 and 300 percent elongation are improved whatever is the used quality of silanated filler, the modulus increasing when the filler quantity is increasing. In all cases the tear resistance increases, and a maximum is obtained when the quantity of fibers is equal to about 50 parts by weight per 100 parts by weight of elastomer. The breaking strength is improved when the filler quantity is between 5 and 15 parts by weight.

TABLE 4

| COMPOSITIONS | A | B | C | D | E | F | G | H |
|---|---|---|---|---|---|---|---|---|
| Smoked sheets ("Cercle jaune") | 100 | 100 | 100 | 100 | 100 | 100 | 100 | 100 |
| Silanated fibers containing 2% of grafted carbon | — | 5 | 10 | 15 | 25 | 50 | 100 | 150 |
| Diethylene glycol | — | 0.3 | 0.7 | 1 | 1.5 | 2 | 3 | 4 |
| Naftolen H | 6 | 6 | 6 | 6 | 6 | 6 | 6 | 6 |
| Stearic acid | 1.5 | 1.5 | 1.5 | 1.5 | 1.5 | 1.5 | 1.5 | 1.5 |
| Zinc oxide | 5 | 5 | 5 | 5 | 5 | 5 | 5 | 5 |
| Sulfur | 2 | 2 | 2 | 2 | 2 | 2 | 2 | 2 |
| MBTS accelerators | 1 | 1 | 1 | 1 | 1 | 1 | 1 | 1 |
| DPG accelerators | 0.5 | 0.5 | 0.5 | 0.5 | 0.5 | 0.5 | 0.5 | 0.5 |
| TMTD accelerators | 0.3 | 0.3 | 0.3 | 0.3 | 0.3 | 0.3 | 0.3 | 0.3 |

Naftolen H = Naphtene plasticizer provided by the firm Kauchukgesellschaft
MBTS = Mercaptobenzothiazyl disulfide
DPG = Diphenylguanidine
TMTD = Tetramethylthiuramdisulfide

TABLE 5

| COMPOSITION | A | B | C | D | E | F | G | H |
|---|---|---|---|---|---|---|---|---|
| Breaking - strength (kgf/cm²) | 203 | 210 | 205 | 220 | 180 | 176 | 151 | 137 |
| Elongation at break, % | 620 | 600 | 590 | 525 | 490 | 365 | 245 | 200 |
| Modulus at 100% (kgf/cm²) | 7.7 | 17 | 26 | 41 | 57 | 81 | 94 | 90 |
| Modulus at 200% (kgf/cm²) | 15 | 27 | 38 | 56 | 74 | 107 | 131 | — |
| Modulus at 300% (kgf/cm²) | 23 | 38 | 52 | 70 | 90 | 127 | — | — |
| Hardness (° DIDC) | 43 | 52 | 56 | 63 | 69 | 75 | 83 | 87 |
| Tear resistance (kgf/cm) | 30 | 36 | 38 | 47 | 45 | 50 | 43 | 38 |
| Rebound elasticity (%) | 65 | 62 | 58 | 53 | 47 | 38 | 27 | 19 |

EXAMPLE 3

The mode of operation of Example 1 was repeated by using asbestos silanated fibers containing 8 percent of grafted carbon by weight. Compositions so prepared contained respectively 0, 45 and 100 parts by weight of filler per 100 parts by weight of elastomer. Table 6 gives the most interesting properties which have been measured at the optimum vulcanization.

TABLE 6

| Amount of Filler | 0 | 45 | 100 |
|---|---|---|---|
| Breaking strength (kgf/cm²) | 25 | 111 | 240 |
| Elasticity torsion | 1 | 43.6 | 512.6 |
| Tear resistance (kgf/cm) | 17 | 19 | 30 |

EXAMPLE 4

The mode of operation of Example 1 was repeated by using silanated fibers containing 9.4 percent of grafted carbon. The quantities of different fillers were adjusted in order to obtain compositions having a hardness (DIDC) equal to 90. Two compositions were prepared: the first was reinforced with carbon black (90 parts by weight) and the other was reinforced with silanated fibers (60 parts by weight). Table 7 gives the properties of the compositions measured at the optimum vulcanization.

TABLE 7

Hardness (°DIDC): 90

| Nature of the Filler | Carbon Black HAF | Silanated Fibers 9.4%C. |
|---|---|---|
| Breaking strength (kgf/cm²) | 158 | 265 |
| Tear resistance (kgf/cm) | 27 | 27 |
| Rebound elasticity | 41 | 60 |
| Remanent deformation after compression of 25%, % | 4.6 | 3.5 |
| Goodrich heating °C. | 36 | 15 |
| Goodrich deformation % | 0.8 | 0.6 |
| Torsion modulus (10⁻⁷ dynes cm²) | | |
| 3G at 20° C. | 36.3 | 45.7 |
| 3G at 100° C. | 23.1 | 52.3 |
| 3G at 250° C. | 10.6 | 64.1 |

By using silanated fibers containing 9.4 percent of grafted carbon the properties are improved in comparison with the reference test using carbon black. The tear resistance alone is not changed.

EXAMPLE 5

This example shows the improvements brought to caoutchoutic compositions strengthened with carbon black when partially replacing this conventional filler by silanated fibers. By employing the above-mentioned mode of operation of Example 2, different compositions were prepared. The quantities of fillers (see Table 8) were adjusted so as to obtain a hardness of about 60. Silanated asbestos fibers containing 2 percent of grafted carbon by weight were used and the vulcanization was achieved with a sulfur system.

TABLE 8

| COMPOSITION | | I | J | K | L | M |
|---|---|---|---|---|---|---|
| Smoked sheets ("Cercle jaune") | | 100 | 100 | 100 | 100 | 100 |
| Fibers with 2% of carbon | | 15 | 11.25 | 7.5 | 3.75 | — |
| Carbon black HAF | | — | 9 | 18 | 27 | 36 |
| Diethylene glycol | | 1 | 0.75 | 0.5 | 0.25 | — |
| Naftolen H | | 6 | 6 | 6 | 6 | 6 |
| Stearic acid | | 1.5 | 1.5 | 1.5 | 1.5 | 1.5 |
| Zinc oxide | | 5 | 5 | 5 | 5 | 5 |
| Sulfur | | 2 | 2 | 2 | 2 | 2 |
| MBTS | Accelerators | 1 | 1 | 1 | 1 | 1 |
| DPG | Accelerators | 0.5 | 0.5 | 0.5 | 0.5 | 0.5 |
| TMTD | Accelerators | 0.3 | 0.3 | 0.3 | 0.3 | 0.3 |

For the compositions shown in Table 8, the optimum amount of each type of filler used alone has been measured in order to obtain a composition having a hardness equal to 60± 5. These amounts were respectively equal to 15 parts by weight of silanated fibers and 36 parts by weight of carbon black for 100 parts by weight of elastomer. Each optimum amount representing 100, each product is used in the proportions 100, 75, 50, 25 and 0 percent of the mixed filler constituted by silanated fibers + carbon black. For example, the filler constituted by 11.25 parts of silanated fibers and 9 parts of carbon black contains 75 percent by weight of the optimum amount of silanated fibers and 25 percent by weight of the optimum amount of carbon black. In order to simplify, such a filler is designated herebelow by the ratio 75/25.

Table 9 gives the properties of the compositions of Table 8 measured at the optimum vulcanization.

Table 9 shows the improved properties of the compositions filled with mixed filler (carbon black + silanated fibers) in comparison with compositions containing either carbon black or silanated fibers alone. It can be observed:

an increase of the breaking strength and of the elongation at break, especially for the ratios silanated fibers/carbon black equal to 25/75, 50/50, and 75/25, an increase of the modulus at 100 percent and of the

TABLE 9

| COMPOSITION | I | J | K | L | M |
|---|---|---|---|---|---|
| Breaking strength (kgf/cm$^2$) | 220 | 263 | 273 | 295 | 255 |
| Elongation at break (%) | 525 | 530 | 550 | 535 | 490 |
| Modulus at 100% (kgf/cm$^2$) | 41 | 35 | 30 | 27 | 23 |
| Modulus at 200% (kgf/cm$^2$) | 56 | 54 | 53 | 61 | 63 |
| Modulus at 300% (kgf/cm$^2$) | 70 | 82 | 88 | 113 | 122 |
| Hardness (° DIDC) | 63 | 62 | 63 | 63 | 64 |
| Tear resistance (kgf/cm) | 47 | 47 | 53 | 63 | 73 |
| Rebound elasticity (%) | 53 | 52 | 50 | 45 | 42 | rebound elasticity when the fiber amount is increasing.

When contemplating the properties of each composition as a whole, Table 9 shows that the use of mixed fillers have a synergic effect, the results obtained being improved in comparison with the use of each filler separately. The mixed fillers containing fibers and carbon black in a ratio of about 50/50 is the most surprising one.

EXAMPLE 6

The mode of operation of Example 5 was repeated but by using silanated fibers and/or silica as filler. Table 10 gives the amounts of different ingredients which have been adjusted in order to obtain final compositions having a hardness equal to 60± 5. The optimum amount of each filler used alone was equal to 15 parts by weight of silanated fibers and 80 parts by weight of silica for 100 parts by weight of elastomer.

EXAMPLE 7

Two compositions S and T having a hardness equal to 60± 5 containing the following mixed fillers were prepared (in parts by weight per 100 parts by weight of elastomer):

S: 7.5 parts of silanated fibers (with 2% by weight of grafted carbon) and 18 parts of carbon black, that is a ratio silanated fibers/carbon black equal to 50/50.

T: 5 parts of silanated fibers (with 2 percent by weight of grafted carbon), 12 parts of carbon black and 25 parts of silica, that is a ratio silanated fibers/carbon black/silica equal to 33.3/33.3/33.3.

Both compositions have been vulcanized by means of a sulfur system.

TABLE 10

| COMPOSITION | N | O | P | Q | R |
|---|---|---|---|---|---|
| Smoked sheets ("cercle jaune") | 100 | 100 | 100 | 100 | 100 |
| Fibers with 2% by weight of grafted carbon | 15 | 11.25 | 7.5 | 3.75 | — |
| Fransil 251 (silica provided by the firm Safic-Alcan) | — | 20 | 40 | 60 | 80 |
| Diethylene glycol | 1 | 0.75 | 0.5 | 0.25 | — |
| Naftolen H | 6 | 6 | 6 | 6 | 6 |
| Stearic acid | 1.5 | 1.5 | 1.5 | 1.5 | 1.5 |
| Zinc oxide | 5 | 5 | 5 | 5 | 5 |
| Sulfur | 2 | 2 | 2 | 2 | 2 |
| MBTS | 1 | 1 | 1 | 1 | 1 |
| DPG | 0.5 | 0.5 | 0.5 | 0.5 | 0.5 |
| TMTD | 0.3 | 0.3 | 0.3 | 0.3 | 0.3 |

Table 11 gives mechanical properties of the compositions N to R, measured at the optimum vulcanization.

TABLE 11

| COMPOSITION | N | O | P | Q | R |
|---|---|---|---|---|---|
| Breaking strength (kgf/cm$^2$) | 220 | 246 | 270 | 262 | 233 |
| Elongation at break (%) | 525 | 585 | 610 | 610 | 720 |
| Modulus at 100% (kgf/cm$^2$) | 41 | 34 | 27 | 21 | 12 |
| Modulus at 200% (kgf/cm$^2$) | 56 | 49 | 43 | 38 | 21 |
| Modulus at 300% (kgf/cm$^2$) | 70 | 68 | 63 | 60 | 34 |
| Hardness (° DIDC) | 63 | 61 | 62 | 63 | 61 |
| Tear resistance (kgf/cm) | 47 | 47 | 54 | 66 | 53 |
| Rebound elasticity (%) | 53 | 55 | 50 | 41 | 38 |

Table 11 shows that the use of silanated fibers improves the modulus and the rebound elasticity in comparison with the use of silica alone as strengthening filler. Except the elongation at break, the mechanical properties, particularly the breaking strength, of a composition reinforced by a mixed filler with a ratio silanated fibers/silica comprised between 25/74 and 75/25 are better than those of a composition containing only silica.

The vulcanization kinetic was studied with a Monsanto Rheometer at 150°C. Table 12 gives the mechanical properties measured at the optimum vulcanization. Table 12 shows that a mixed filler constituted by silanated fibers and carbon black improves the breaking strength and the modulus and that a ternary filler constituted by silanated fibers-carbon black-silica improves the elongation at break, the rebound elasticity and the Goodrich heating. Therefore it is possible to obtain compositions according to the invention which are perfectly adapted for very different applications.

TABLE 12

| COMPOSITION | S | T |
|---|---|---|
| Properties at room temperature | | |
| Breaking strength (kgf/cm$^2$) | 293 | 269 |
| Elongation at break (%) | 660 | 680 |
| Hardness (° DIDC) | 62.5 | 61.5 |
| Modulus at 100% (kgf/cm$^2$) | 22 | 18 |
| Modulus at 200% (kgf/cm$^2$) | 43 | 35 |
| Modulus at 300% (kgf/cm$^2$) | 75 | 60 |
| Rebound elasticity (%) | 65 | 73 |
| Resistance to repeated compression | | |
| Goodrich heating °C | 14 | 9 |
| Properties at 0°C | | |
| Breaking strength (kgf/cm$^2$) | 293 | 250 |
| Elongation at break (%) | 560 | 575 |
| Modulus at 100% (kgf/cm$^2$) | 26 | 20 |
| Modulus at 200% (kgf/cm$^2$) | 56 | 43 |
| Modulus at 300% (kgf/cm$^2$) | 103 | 81 |
| Properties at 100°C | | |
| Breaking strength (kgf/cm$^2$) | 134 | 131 |
| Elongation at break (%) | 705 | 775 |
| Modulus at 100% (kgf/cm$^2$) | 20 | 18 |
| Modulus at 200% (kgf/cm$^2$) | 32 | 28.5 |
| Modulus at 300% (kgf/cm$^2$) | 43 | 39.5 |

The properties of the compositions described in the examples have been determined according to the following standard test methods:

Strength and elongation at break: NF.T 46002 using type H2 dump-bells;

Modulus: 46002 using test pieces with square heads;

Hardness (DIDC international hardness): NF.T 46003

Tear resistance: ASTM. D 624 by using angular test pieces;

Rebound elasticity: DIN 53-512;

Compression deformation: NF.T 46011;

Resistance to repeated compression (Goodrich flexometer): ASTM D. 62367 according to the following conditions:

| | |
|---|---|
| Temperature: | 38° C. |
| Amplitude: | 17.5% |
| Load: | 12 kg. |

The internal heating and the remanent deformation were noted after 30 minutes;

Torsion elasticity modulus: Standard ASTM D. 1053 (Gehmann).

The preceding examples can be repeated with similar success by sustituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a rubber composition comprising cis-1,4 polyisoprene curable or vulcanizable to an elastomer and a suitable curing or vulcanizing agent, the improvement which comprises 5-150 parts by weight per 100 parts by weight of said polyisoprene of a strengthening filler combination wherein the amount of each filler component used is 25-75 percent of the weight of each individual component which would be required when used alone to give a desired hardness to the cured elastomer, said strengthening filler comprising:

a. 25-75 percent of said required weight of an organomineral polymeric material consisting essentially of a siliceous mineral two-dimensional framework of a phyllosilicate having at least a tetrahedral layer consisting essentially of silicon and oxygen and an octahedral layer consisting essentially of oxygen and metallic atoms other than silicon, and organic radicals having two to 12 carbon atoms having at least one ethylenic double bond linked by Si-O-Si siloxane bonds to said tetrahedral layer of said phyllosilicate, at least 5 percent by weight of the metallic atoms having been removed from the octahedral layer of the phyllosilicate and substituted by said organic radicals, 1 to 30 percent of the silicon atoms of said tetrahedral layer of said phyllosilicate having said organic radicals grafted on them by Si-O-Si bonds, and containing 0.2-20 wt. percent grafted carbon; and b. correspondingly 75-25 percent of said required weight of carbon black, silica or mixtures thereof.

2. A composition according to claim 1 wherein said curable rubber is Hevea rubber.

3. A composition according to claim 2 wherein said siliceous mineral is fibrous asbestos.

4. A composition according to claim 3 wherein said phyllosilicate contains 2-10 wt. percent grafted carbon.

5. A composition according to claim 4 containing about 50 percent each of components a) and b).

6. A composition according to claim 4 wherein said component b) is carbon black.

7. A composition according to claim 4 wherein said component b) is silica.

8. A composition according to claim 4 wherein said component b) is carbon black and silica.

9. A composition according to claim 4 wherein said curing or vulcanizing agent is a peroxide.

10. A composition according to claim 4 wherein said curing or vulcanizing agent is sulfur.

11. A composition according to claim 4 consisting essentially of, in parts by weight:

| | |
|---|---|
| Smoked sheets | 100 |
| Fibers with 2% of carbon | 3.75 – 11.25 |
| Carbon black HAF | 9 – 17 |
| Diethylene glycol | 0.25 – 0.75 |
| Naphthene plasticizer | 6 |
| Stearic acid | 1.5 |
| Zinc oxide | 5 |
| Sulfur | 2 |
| Mercaptobenzothiazyl disulfide | 1 |
| Diphenylguanidine | 0.5 |
| Tetramethylthiuramdisulfide | 0.3 |

12. A composition according to claim 4 consisting essentially of, in parts by weight:

| | |
|---|---|
| Smoked sheets | 100 |
| Fibers with 2% by weight of grafted carbon | 3.75 – 11.25 |
| Silica | 20 – 60 |
| Diethylene glycol | 0.25 – 0.75 |
| Naphthene plasticizer | 6 |
| Stearic acid | 1.5 |
| Zinc oxide | 5 |
| Sulfur | 2 |
| Mercaptobenzothiazyl disulfide | 1 |
| Diphenylguanidine | 0.5 |
| Tetramethylthiuramdisulfide | 0.3 |

13. An elastomer obtained by curing or vulcanizing the composition of claim 1.

14. A light colored, easily dyeable elastomer obtained by peroxide curing or sulfur vulcanizing the composition of claim 7.

* * * * *